United States Patent
Amato et al.

(10) Patent No.: US 7,644,903 B2
(45) Date of Patent: Jan. 12, 2010

(54) ROTATING PEDESTAL WITH LOCK

(75) Inventors: Alexander Amato, Los Angeles, CA (US); Anthony Amato, Los Angeles, CA (US)

(73) Assignee: Metra Electronics, Holly Hills, FL (US)

( * ) Notice: Subject to any disclaimer, the term of this patent is extended or adjusted under 35 U.S.C. 154(b) by 0 days.

(21) Appl. No.: 12/082,060

(22) Filed: Apr. 8, 2008

(65) Prior Publication Data

US 2008/0251675 A1   Oct. 16, 2008

Related U.S. Application Data

(63) Continuation-in-part of application No. 11/655,429, filed on Jan. 19, 2007, now abandoned.

(51) Int. Cl.
*A47B 91/00* (2006.01)
(52) U.S. Cl. .............................. 248/349.1; 248/346.01; 108/94
(58) Field of Classification Search .............. 248/349.1, 248/346.01; 108/94, 103, 104; 211/163
See application file for complete search history.

(56) References Cited

U.S. PATENT DOCUMENTS

| 3,653,340 | A | * | 4/1972 | Bugg | 108/139 |
| 4,550,894 | A | * | 11/1985 | Barlics | 248/346.01 |
| 4,946,127 | A | * | 8/1990 | Kulaga | 248/551 |
| 5,149,043 | A | * | 9/1992 | Grundmann | 248/349.1 |
| 5,479,867 | A | * | 1/1996 | Blevins et al. | 108/94 |
| 6,868,794 | B2 | * | 3/2005 | Bullock et al. | 108/94 |

OTHER PUBLICATIONS

U.S. Appl. No. 11/655,429.

* cited by examiner

*Primary Examiner*—Anita M King
(74) *Attorney, Agent, or Firm*—J. Wiley Horton

(57) ABSTRACT

A rotating pedestal with an integrated locking mechanism configured to lock the pedestal in a desired angular position. The pedestal incorporates a soft heat-resistant top rotatably connected to a fixed base. The integrated locking mechanism is a sliding latch mounted in the base.

20 Claims, 8 Drawing Sheets

ROTATING PEDESTAL WITH LOCK

CROSS-REFERENCES TO RELATED APPLICATIONS

This application is a continuation-in-part of an earlier-filed non-provisional patent application. The earlier application was assigned Ser. No. 11/655,429. It was filed on Jan. 19, 2007 now abandoned, and remains pending as of the time of this filing. The prior application listed the same inventors.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

The present invention relates to the field of rotating pedestals. More specifically, the invention comprises a rotating pedestal specifically configured to support a laptop computer and selectively allow the pedestal to be rotated or locked in one position.

2. Description of the Related Art

Rotating pedestals can be used to support many common items, including laptop computers. Laptops were originally invented to allow portability and the freedom to work and play in a variety of environments. However, consumers still face difficulty when the laptop is shared between two or more users. Each user is faced with the inconvenience of adjusting the laptop for his or her convenience as well as the others sharing it. This dilemma can be witnessed first hand in classrooms, boardrooms, home offices, and such.

Rotating pedestals do allow a laptop to be easily repositioned. However, the very ease of rotation often renders the laptop difficult to use. It is therefore desirable to provide a rotating pedestal which can be rotated to a desired position and then locked in place.

BRIEF SUMMARY OF THE INVENTION

The present invention is a rotating pedestal with an integrated locking mechanism configured to lock the pedestal in a desired angular position. The pedestal preferably incorporates a soft heat-resistant top rotatably connected to a fixed base. The integrated locking mechanism is preferably a sliding latch mounted in the base.

REFERENCE NUMERALS IN THE DRAWINGS

| 10 | top | 12 | outer casing |
|---|---|---|---|
| 14 | lock | 20 | ball bearing case |
| 22 | tooth | 24 | washer |
| 28 | bearing race | 30 | lock receiver |
| 31 | boss | 32 | fastener |
| 34 | hole | 36 | receiver |
| 38 | support surface | 40 | stop surface |
| 42 | engagement chamfer | 44 | grip |
| 46 | slide plate | 48 | stop |
| 50 | pawl | 52 | ring gear |
| 54 | notch | 56 | bottom surface |
| 58 | foot | 60 | disk |

DETAILED DESCRIPTION OF THE INVENTION

Figure 1:
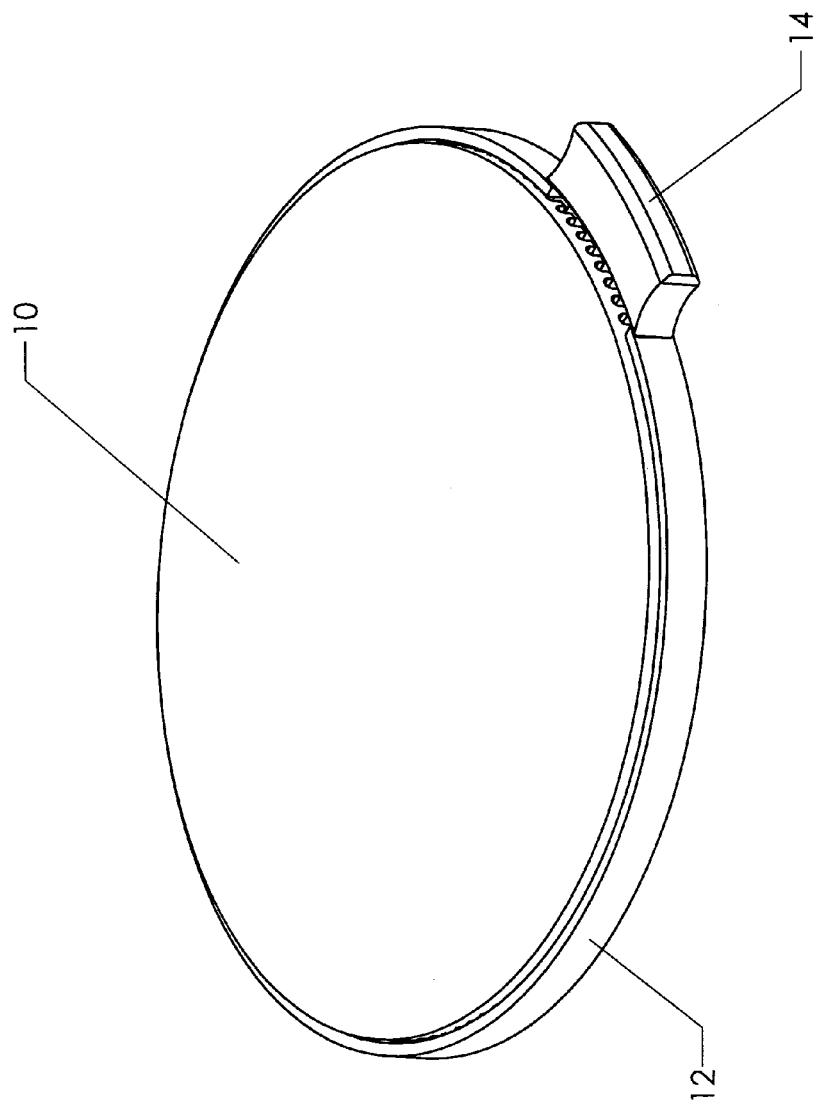
FIG. 1 is a perspective view, showing the invention in an assembled state.

FIG. 1 shows the invention in an assembled state. Outer casing 12 is placed on any reasonably flat surface—such as a table or disk. Top 10 is rotatably connected to outer casing 12. It is normally free to rotate. Thus, an item placed on top 10 can be freely rotated to any desired orientation.

Top 10 is preferably covered in a relatively soft, heat-resistant material. Exemplary materials include rubber, neoprene, and many types of elastic polymer. The covering can be attached by any suitable method, including bonding or overmolding.

Lock 14 is shown in its disengaged position. The user engages the lock by pulling it outward, away from the center of the outer casing. When the lock is pulled outward, it locks the top in a fixed angular position with respect to the outer casing. Further rotation is thereby prevented until the lock is released.

Figure 2:
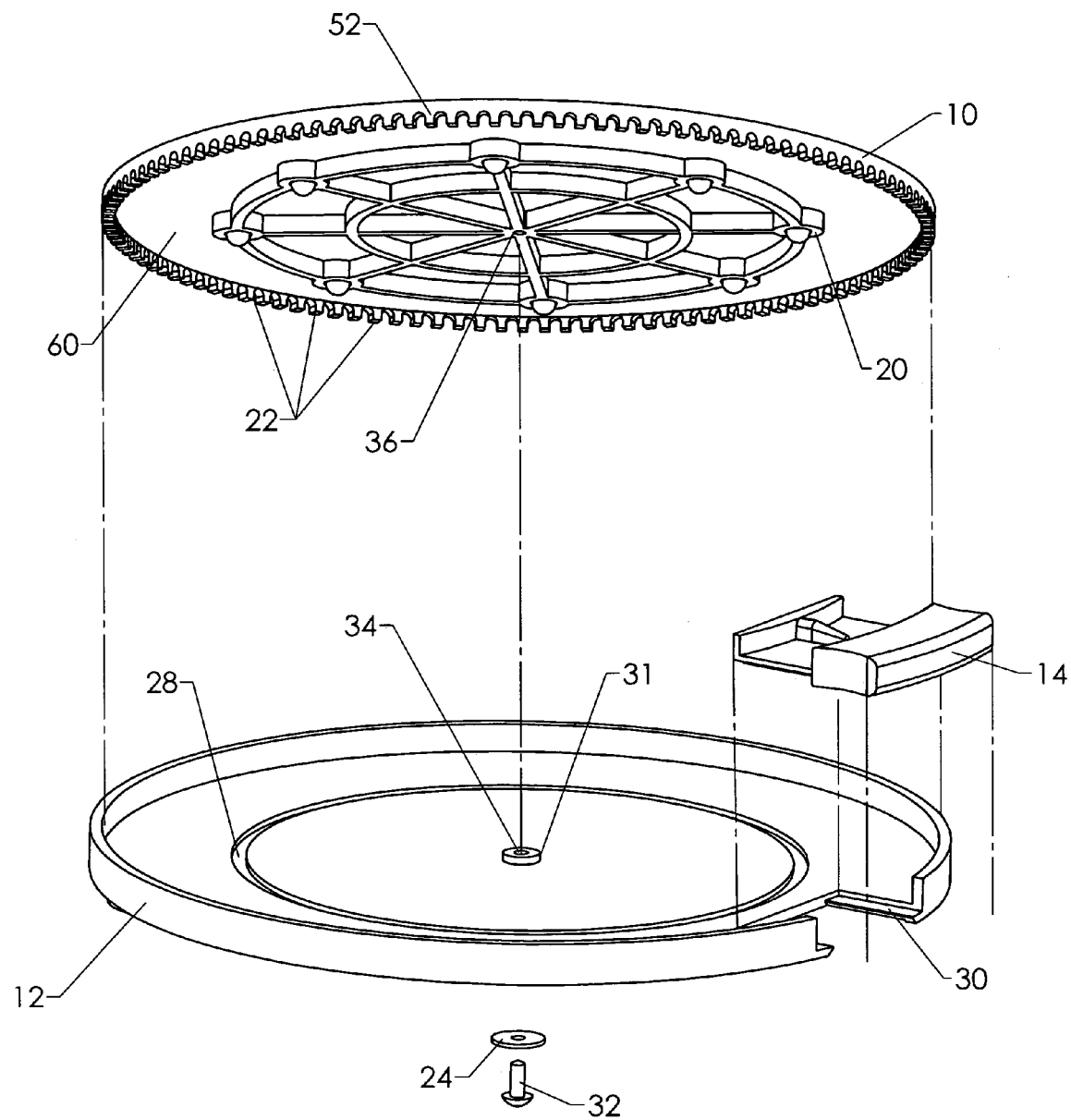
FIG. 2 is an exploded view, showing internal features.

FIG. 2 shows the same device in an exploded state. The desired functionality could be accomplished using any number of internal mechanisms. Thus, the components described hereafter should properly be viewed as one embodiment among many. FIG. 2 shows the underside of top 10. Its main features are a simple disk 60 with a descending ring gear 52 located about the perimeter of the disk. The ring gear includes a number of evenly spaced teeth 22. Receiver 36 is positioned in the center of disk 60. It is configured to receive fastener 32—which is used to link the components together. As one example, receiver 36 could include a female thread designed to receive and engage male threads on fastener 32.

Ball bearing case 20 is positioned inside ring gear 52. This feature contains a plurality of ball bearings positioned to roll within bearing race 28 in outer casing 12 (the bearing race being inset into the upward facing surface of outer casing 12). The ball bearing case includes capturing features which hold the ball bearing securely while still allowing them to rotate. The reader will observe that top 10 is sized to fit within the upstanding outer wall of outer casing 12. Once the top is secured to the outer casing, the top is free to smoothly rotate via the action of the ball bearings rolling within bearing race 28.

Outer casing 12 opens into lock receiver 30, which is sized to receive and capture lock 14 (explained in more detail subsequently). Boss 31, having hole 34 passing completely therethrough, is located in the center of the outer casing. This hole allows the threaded portion of fastener 32 to pass through boss 31 and into receiver 36. Washer 24 is preferably provided to more securely engage the fastener. The dimensions are preferably selected so that the fastener bottoms out in receiver 36 just before any binding between the top and the outer casing occurs. The top is thereby free to smoothly rotate on the ball bearings without having excess play. The outer perimeter of ring gear 52 is preferably sized to fit closely within the inner perimeter of the outer wall of outer casing 12.

Figure 3:
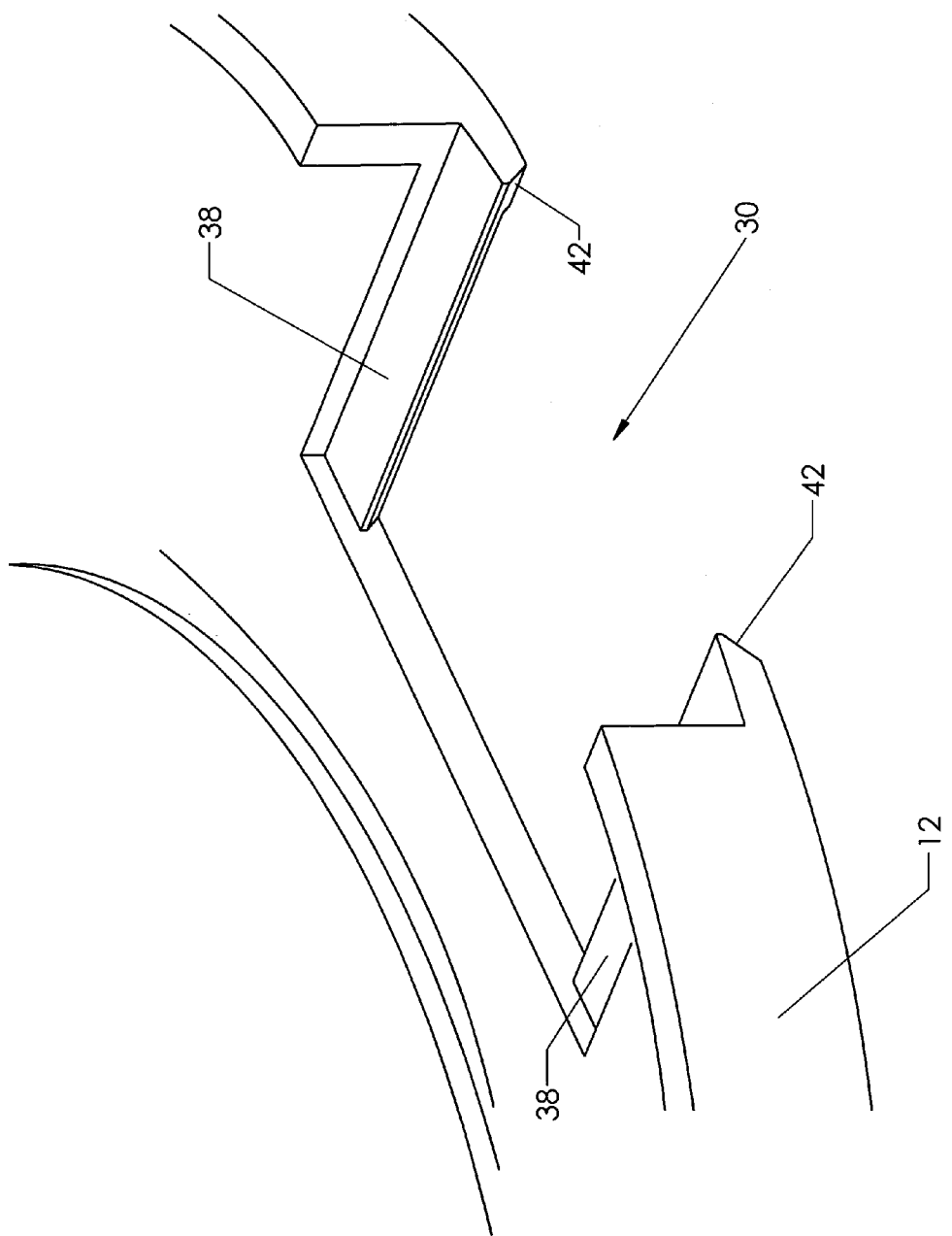
FIG. 3 is a detailed perspective view, showing the lock receiver.
Figure 4:
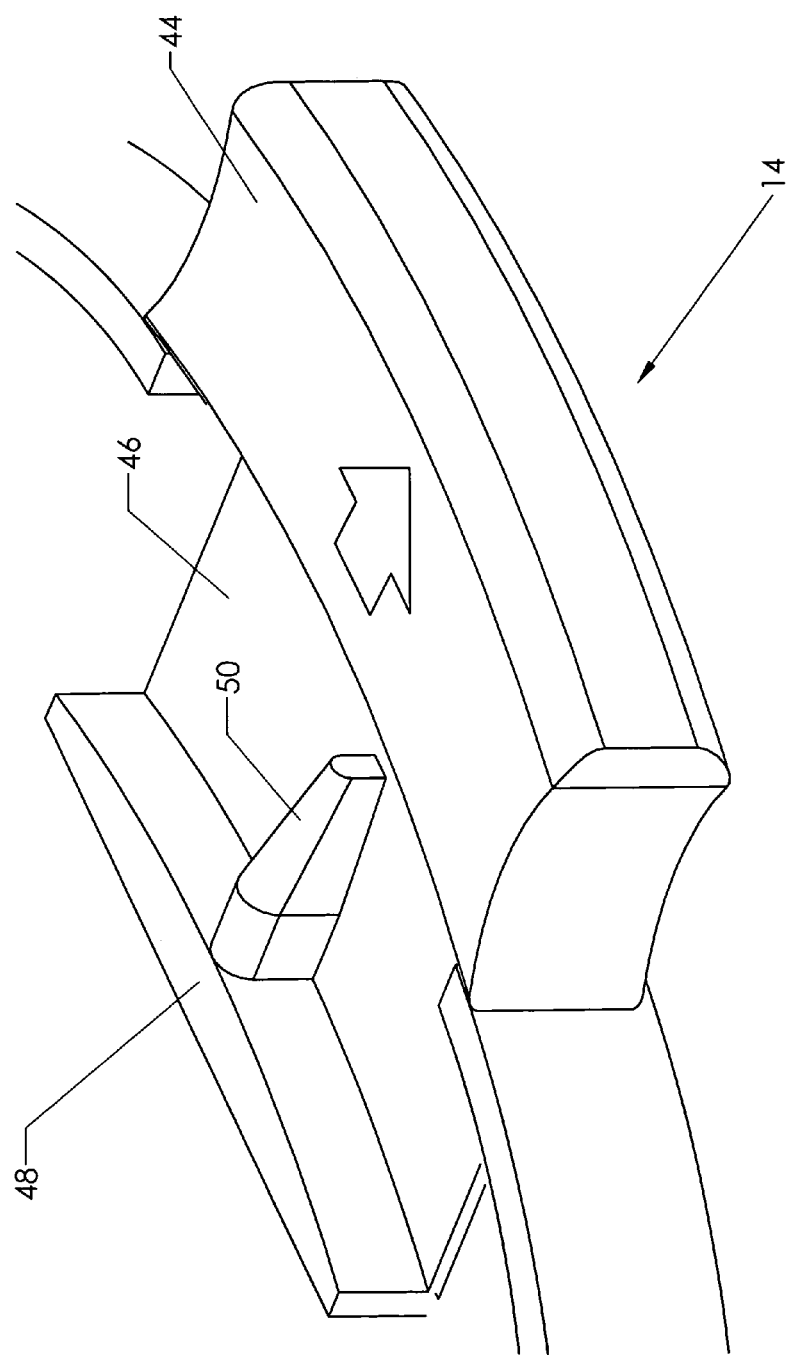
FIG. 4 is a detailed perspective view, showing the lock placed in the lock receiver.

FIG. 3 shows a more detailed view of lock receiver 30 in the outer casing. Each side wall includes a support surface 38 and an engagement chamfer 42. FIG. 4 shows the same area with lock 14 in place within the lock receiver. Slide plate 46 rests atop the two support surfaces. Stop 48 protrudes upward from slide plate 46. Pawl 50 protrudes outward from stop 48. Grip 44 is preferably contoured so that a user may easily grip it and pull the lock outward as indicated by the arrow.

The lock may include features which slide beneath the two engagement chamfers 42 shown in FIG. 3. Such features are preferable, since they will restrict the motion of the lock to simply moving in and out of the lock receiver.

Figure 5:
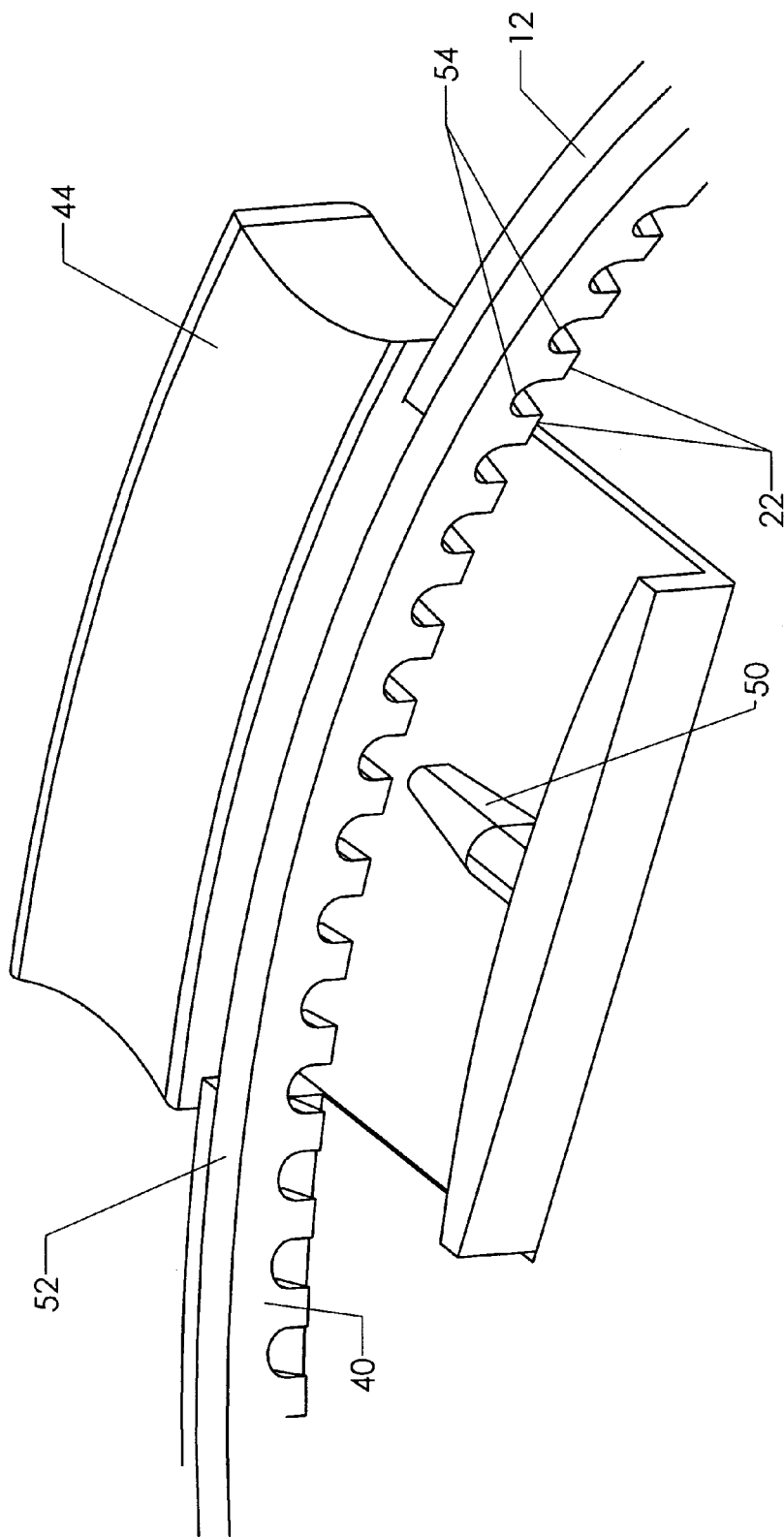
FIG. 5 is a detailed perspective view with a cutaway, showing the operation of the lock.
Figure 6:
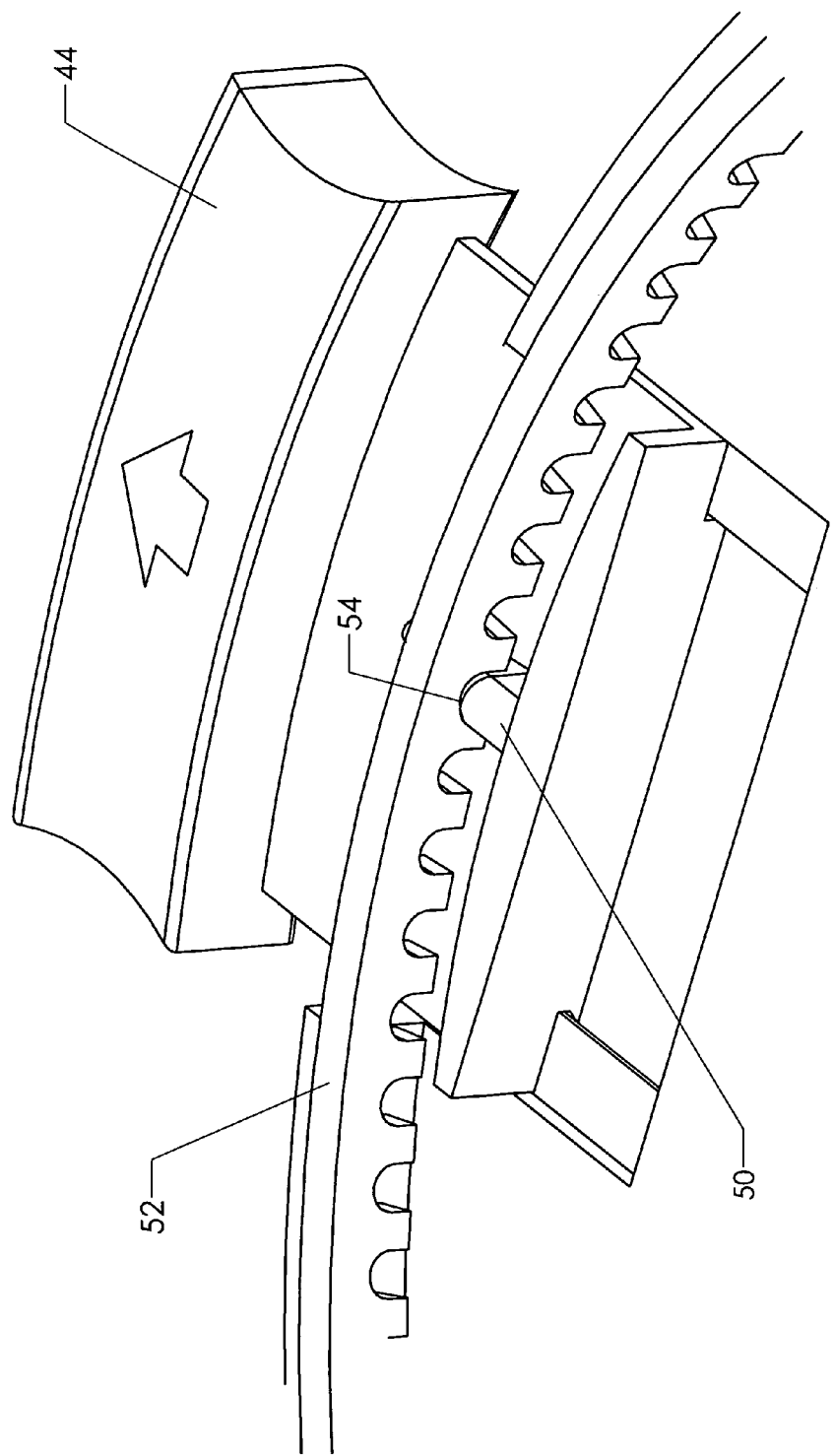
FIG. 6 is a detailed perspective view with a cutaway, showing the operation of the lock.
Figure 7:
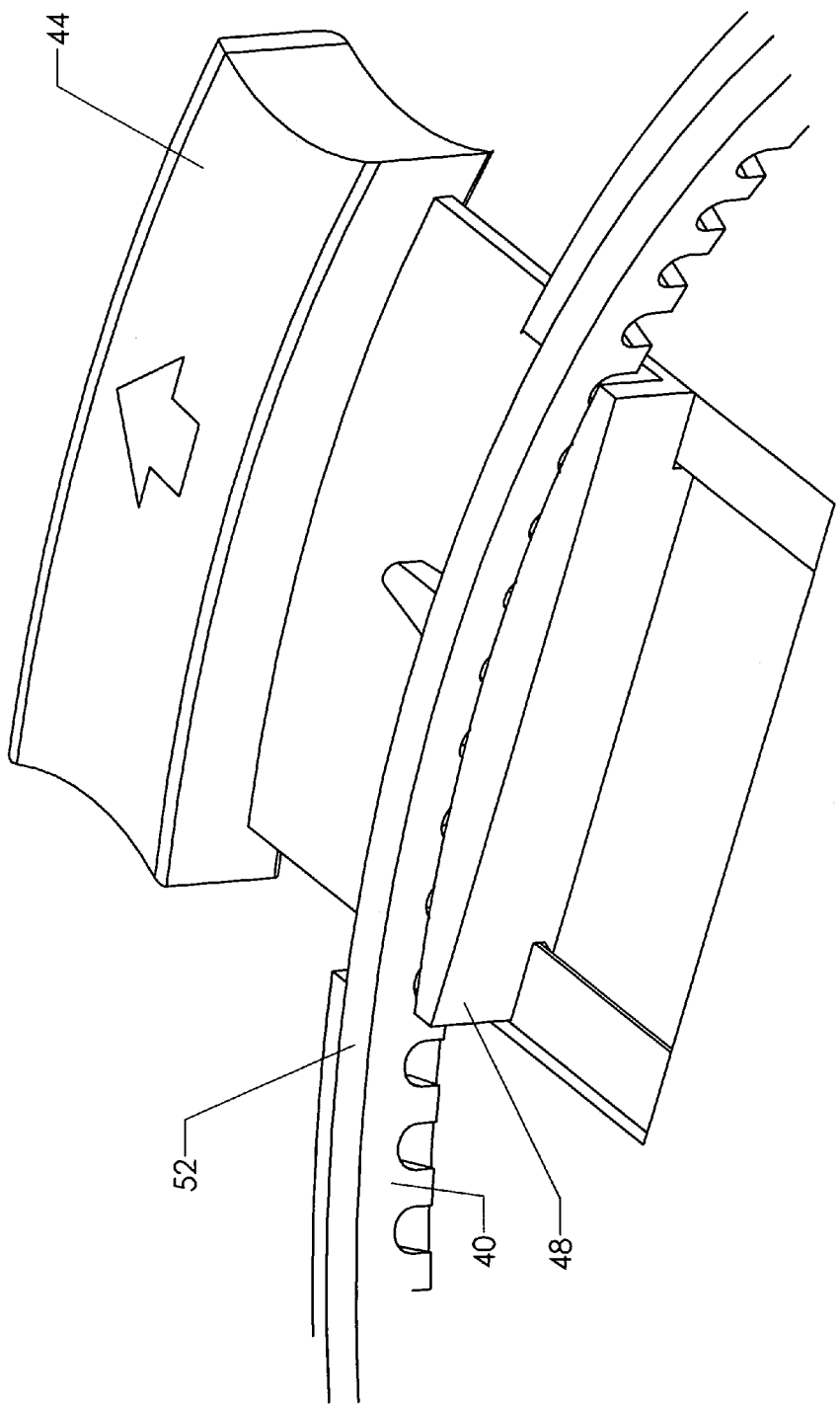
FIG. 7 is a detailed perspective view with a cutaway, showing the operation of the lock.

FIGS. 5-7 illustrate the locking action of lock 14 as it is moved within the lock receiver. FIG. 5 shows top 10, outer casing 12, and lock 14 in an assembled state. However, the entire disk 60 of top plate 10 has been cut away in the view so that the user may easily observe the position of ring gear 52. The perspective is from the inside of the outer casing, looking outward toward its perimeter. The ring gear is in the position it occupies when the invention is in the assembled state. The reader will note that pawl 50 is well clear of the ring gear. The top is thereby free to rotate.

Pawl 50 is provided with a taper on its exposed end facing ring gear 52. The notches in the ring gear are preferably flared on the side facing the pawl. These features allow the pawl to smoothly engage the ring gear even when the pawl does not happen to be aligned with a notch.

If the user wishes to lock the top in a desired angular position, the user grasps grip 44 and pulls the lock outward. FIG. 6 shows the lock moved partially outward. Pawl 50 has engaged one of the many notches 54 between the teeth 22. If the pawl is given an appropriate height, its engagement with the ring gear can actually create a wedging action which tends to force the top away from the outer casing. This effect ensures a tight and frictionally retained engagement when the lock is moved outward. Of course, if the engagement is made too tight, the lock may not function well. Thus, the pawl and ring gear are preferably sized to provide a tight fit that does not unduly stress the assembly.

In FIG. 7, the user has continued pulling outward on grip 44 until stop 48 has actually mated against the inner circumference of ring gear 52. This arrests further outward movement, thereby capturing the lock so that it cannot be accidentally pulled free of the device.

Those skilled in the art will thereby realize that the lock is captured in the device by placing it within the lock receiver, then assembling the top to the outer casing. The lock's inward travel is limited by the inward facing surface of handle 44 bearing against the outward facing surface of outer casing 12. The lock's outward movement is limited by stop 48 bearing against the ring gear.

Figure 8:
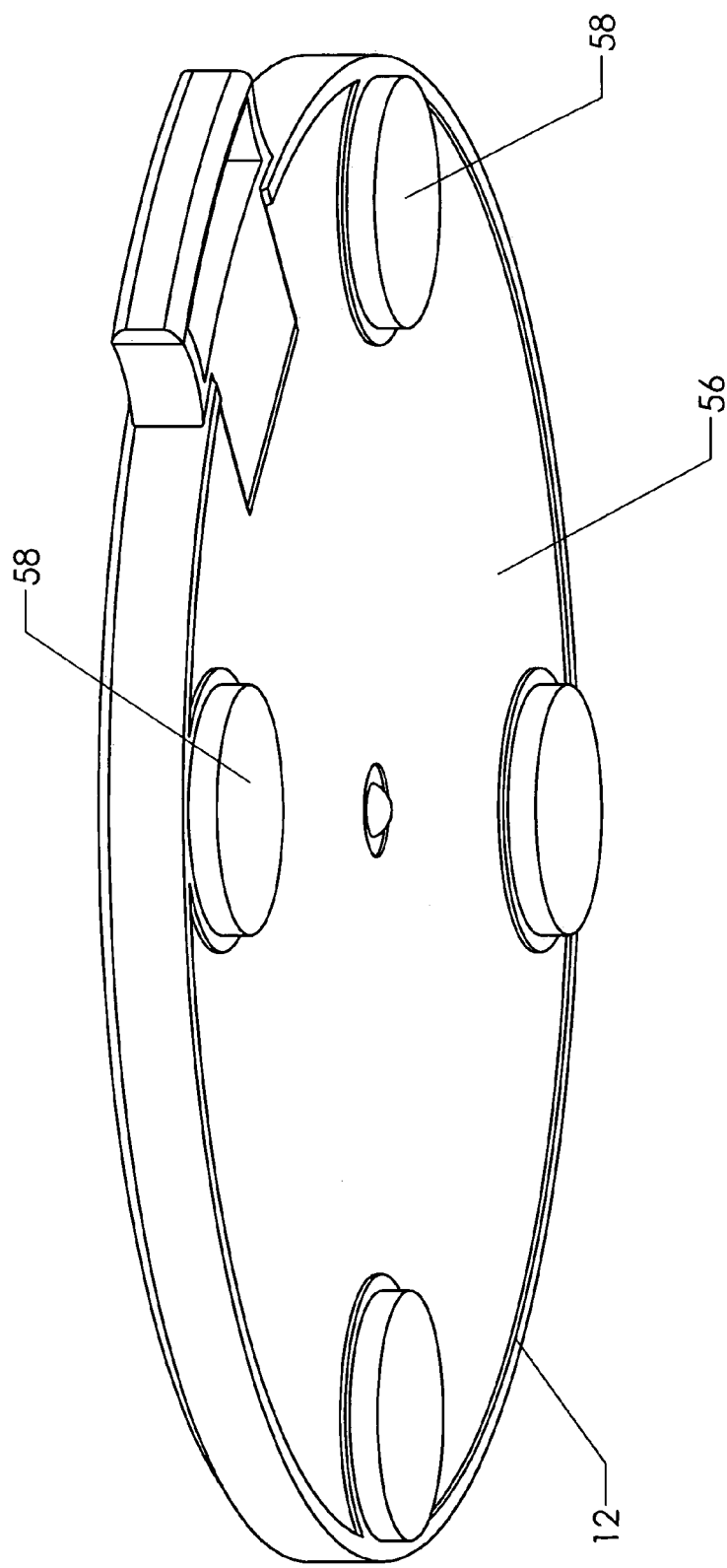
FIG. 8 is a perspective view, showing the underside of the outer casing.

FIG. 8 shows the assembled invention from the bottom. Bottom surface 56 preferably includes a plurality of feet 58. These are resilient pads of material intended to provide a good grip on table or desk surfaces. The user will also note the previously described fastener and washer in position in the center of the bottom surface.

While the invention is not dependent upon the selection of any particular material, the reader may benefit from some discussion of practical ways to manufacture the invention. Returning to FIG. 2, those skilled in the art will readily appreciate that top 10 and outer casing 12 may be conveniently made by injection molding. other features, such as ball bearing case 20, can be assembled by conventional snap engagements.

The top preferably has a resilient material on its upper surface. This could be a bonded layer or an overmolded layer. Likewise, the feet on the bottom of the outer casing could be separate components or could be an overmolded layer. The material for the top is preferably heat resistant, since laptop computers and similar devices may become hot.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

Having described our invention, we claim:

1. A pedestal, comprising:
   a. an outer casing, having a downward facing side, an upward facing side, a center, and an outer wall;
   b. a top, having a downward facing side, an upward facing side, a center, and an outer perimeter;
   c. wherein said top is rotatably attached to said outer casing;
   d. a lock, movable between a first position proximate said center of said outer casing and a second position distal to said center of said outer casing;
   e. a ring gear descending downward from said top, said ring gear having a plurality of teeth separated by a plurality of notches; and
   f. a pawl on said lock, said pawl configured to slide into and engage one of said notches on said ring gear.

2. A pedestal as recited in claim 1, wherein:
   a. said outer casing includes a lock receiver; and
   b. said lock is slidably mounted within said lock receiver.

3. A pedestal as recited in claim 1, wherein said pawl includes a tapered portion positioned to first engage said one of said notches.

4. A pedestal as recited in claim 3, wherein when said lock is in said second position said lock is wedged tightly between said outer casing and said ring gear.

5. A pedestal as recited in claim 1, wherein:
   a. said ring gear has an inner perimeter; and
   b. said lock has a stop configured to bear against said inner perimeter of said ring gear when said lock is in said second position.

6. A pedestal as recited in claim 1, wherein said lock has a grip positioned on the outside of said outer casing.

7. A pedestal as recited in claim 6, wherein said grip has an inward facing surface configured to bear against said outer wall of said outer casing when said lock is in said first position.

8. A pedestal as recited in claim 5, wherein said lock has a grip positioned on the outside of said outer casing.

9. A pedestal as recited in claim 8, wherein said grip has an inward facing surface configured to bear against said outer wall of said outer casing when said lock is in said first position.

10. A pedestal, comprising:
  a. an outer casing, having a downward facing side, an upward facing side, a center, and an outer wall;
  b. a top, having a disk and a ring gear descending downward from said disk;
  c. wherein said ring gear includes a plurality of teeth separated by a plurality of notches;
  d. a circular ball bearing case attached to said top, said ball bearing case having a plurality of ball bearings facing downward;
  e. wherein said top is rotatably attached to said outer casing with said upward facing side of said outer casing facing said ball bearing case;
  f. a lock, movable between a first position proximate said center of said outer casing and a second position distal to said center of said outer casing;
  g. wherein when said lock is in said first position said top is free to rotate with respect to said outer casing; and
  h. wherein when said lock is in said second position said lock engages said ring gear, thereby rotatably securing said top with respect to said outer casing.

11. A pedestal as recited in claim 10, wherein:
  a. said outer casing includes a lock receiver; and
  b. said lock is slidably mounted within said lock receiver.

12. A pedestal as recited in claim 10, further comprising a bearing race in said upward facing side of said outer casing, said bearing race being sized and positioned to receive said plurality of ball bearings within said ball bearing case.

13. A pedestal as recited in claim 10, wherein said lock includes a pawl positioned to slide into one of said notches when said lock is moved from said first position to said second position.

14. A pedestal as recited in claim 13, wherein said pawl includes a tapered portion positioned to first engage said one of said notches.

15. A pedestal as recited in claim 14, wherein when said lock is in said second position said lock is wedged tightly between said outer casing and said ring gear.

16. A pedestal as recited in claim 10, wherein:
  a. said ring gear has an inner perimeter; and
  b. said lock has a stop configured to bear against said inner perimeter of said ring gear when said lock is in said second position.

17. A pedestal as recited in claim 10, wherein said lock has a grip positioned on the outside of said outer casing.

18. A pedestal as recited in claim 17, wherein said grip has an inward facing surface configured to bear against said outer wall of said outer casing when said lock is in said first position.

19. A pedestal as recited in claim 15, wherein said lock has a grip positioned on the outside of said outer casing.

20. A pedestal as recited in claim 16, wherein said pawl includes a tapered portion positioned to first engage said one of said notches.

* * * * *